United States Patent [19]

Shindou et al.

[11] Patent Number: 5,304,401
[45] Date of Patent: Apr. 19, 1994

[54] METHOD OF PRODUCING ORGANIC COMPOSITE-PLATED STEEL SHEET

[75] Inventors: Yoshio Shindou; Motoo Kabeya; Fumio Yamazaki, all of Kimitsu, Japan

[73] Assignee: Nippon Steel Corporation, Tokyo, Japan

[21] Appl. No.: 791,244

[22] Filed: Nov. 13, 1991

[30] Foreign Application Priority Data

Nov. 14, 1990 [JP] Japan .................. 2-305962

[51] Int. Cl.$^5$ .............................. B05D 1/36
[52] U.S. Cl. ......................... 427/410; 427/405; 427/416; 427/419.1
[58] Field of Search .......... 427/405, 410, 419.1, 427/416

[56] References Cited

U.S. PATENT DOCUMENTS

| | | | |
|---|---|---|---|
| 4,756,935 | 7/1988 | Takimoto et al. | 427/410 |
| 4,876,160 | 10/1989 | Shindou et al. | 427/410 |

FOREIGN PATENT DOCUMENTS

| | | |
|---|---|---|
| 0298409 | 1/1989 | European Pat. Off. |
| 0348890 | 1/1990 | European Pat. Off. |
| 0385362 | 9/1990 | European Pat. Off. |
| 0391442 | 10/1990 | European Pat. Off. |
| 50-158535 | 12/1975 | Japan |
| 54-161549 | 12/1979 | Japan |
| 55-51032 | 12/1980 | Japan |
| 58-22383 | 2/1983 | Japan |
| 59-162278 | 9/1984 | Japan |
| 60-50181 | 3/1985 | Japan |
| 60-149786 | 8/1985 | Japan |
| 61-584 | 1/1986 | Japan |
| 62-83478 | 4/1987 | Japan |
| 1-11830 | 1/1989 | Japan |

*Primary Examiner*—Shrive Beck
*Assistant Examiner*—Diana L. Dudash
*Attorney, Agent, or Firm*—Pollock, Vande Sande & Priddy

[57] ABSTRACT

The present invention provides a method for producing a highly corrosion resistant organic composite-plated steel sheet which is inhibited from liberation of chromium, which comprises forming a chromate film comprising a composition of the following (A) as a first layer at a coating amount of 5-150 mg/m$^2$ as a solid film on the surface of a zinc or zinc alloy plated or zinc composite alloy plated steel sheet and then, coating on the first layer an organic solvent coating composition of the following (B) as a second layer at a thickness of 0.3-5 μm as a solid film.

(A) coating type chromate bath composition
 ① $Cr^{6+}$: 1-30 g/l,
 ② $Cr^{3+}$: 1-30 g/l,
 ③ $Cr^{6+}/Cr^{3+}$ weight ratio: 0.2-2.0,
 ④ $HF + H_3PO_4$: 1-60 g/l,
 ⑤ $HF + H_3PO_4/Cr^{3+}$ weight ratio: 0.5-3.5, and
 ⑥ silane coupling agent/$Cr^{6+}$ molar ratio: 0.05-0.3

(B) organic solvent coating composition
 (a) a bisphenol epoxy resin having a number-average molecular weight of 300-100,000 in an amount of 30% by weight or more based on the solid content of the coating composition;
 (b) at least one curing agent selected from the group consisting of polyisocyanate compounds and blocked polyisocyanate compounds at 1/10-20/10 in a weight ratio to solid content of the epoxy resin;
 (c) fumed silica of 0.1-100 mμ in an average particle size in an amount of 5-50% by weight based on the solid content of the coating composition;
 (d) a ketone type organic solvent in an amount of 40% by weight or more based on the weight of the coating composition; and the solid content of the coating composition being in the range of 10-50% by weight.

6 Claims, 2 Drawing Sheets

* ---- REDUCTION BY METHANOL AND SOLVENT

METHOD OF PRODUCING ORGANIC COMPOSITE-PLATED STEEL SHEET

BACKGROUND OF THE INVENTION

1. Field of the Invention

The present invention relates to an organic composite-plated steel sheet provided with a thin film coating thereon, more particularly to a method for producing the organic composite-plated steel sheet prevented from liberation of chromium and high in corrosion resistance.

2. Description of Related Art

Recently, reduction of cost and enhancement of the rust resistance of zinc- or zinc alloy-plated steel sheets (hereinafter referred to as "zinc alloy-plated steel sheets") has been highly desired by the fields of automobiles and appliances, and researches for the development of new products have been increasingly conducted.

In the production of the organic composite-plated steel sheets by applying a thin film coating on the above-mentioned zinc plated steel sheet which has been chromated, the chromating has been required to be carried out by coating.

In order to meet this requirement, it is necessary to develop a hardly soluble chromate coating type treatment technique which inhibits chromium from liberation from the coated chromate film.

A proposal to make the chromate film hardly soluble has been reported in JP-A-50-158535.

This patent application discloses a chromating solution of a chromic anhydride—phosphoric acid—water-soluble or water-dispersible polymer compound type, in which at least 70% of hexavalent chromium ions have been reduced with a reducing agent such as ethylene glycol. However, the chromate film produced by this technique contains polymers and so, is inferior in weldability though superior in hard-solubility, corrosion resistance and coatability.

The chromate solution disclosed in JP-B-61-58552 is of a chromic acid—chromic acid reduction product—silica sol type. However, there is the problem that when the surface-treated steel sheet having the chromate film formed thereon is worked and coated, mainly hexavalent chromium ions in the chromate film are readily liberated by washing with water before the coating, resulting in reduction of the corrosion resistance of the film.

Furthermore, use of silane coupling agents for reduction of hexavalent chromium ions in the chromating solution is disclosed in JP-A-58-22383 and 62-83478. Films formed by the processes mentioned therein are all excellent in adhesion, but the chromate films formed by the process mentioned in the former patent application are inferior in the alkali resistance, because they are formed with chromating solution containing no phosphoric acid and the chromate films formed by the process mentioned in the latter patent application are also inferior in the alkali resistance.

Properties of respective components in the above-mentioned conventional chromating processes were examined to find that organic polymers and silica have tendencies to enhance the corrosion resistance but deteriorate the alkali resistance, and silane coupling agents have a tendency to reduce hexavalent chromium ions in the chromating solution to cause transient decrease in the hexavalent chromium ion concentration of the chromating solution and to make the corrosion resistance of the chromate film unstable.

As mentioned above, various processes have been disclosed, but in all of them, the properties of the chromate films depend greatly upon drying conditions in the chromating process Furthermore, it has been proposed in JP-B-55-51032 and JP-A-59-162278 and 61-584 to increase the rust resistance by coating an aqueous solution of a mixture of a water-dispersible emulsion resin with chromic acid or a chromate compound of a high rust resistance on the surface of zinc-plated or zinc alloy-plated steel sheets. However, all of the resulting films are high in rust resistance, but sweating or liberation of chromium with an aqueous treating solution are seen. Thus, there are some practical problems. Moreover, JP-A-60-50181 and 60-149786 propose to carry out the thin film coating of a blend of a water-dispersible emulsion resin and an organic composite silicate (silica sol, a silane coupling agent or the like). These processes do not offer the problems of the liberation of chromium, but they have problems in the properties of the coated film, especially water resistance, because the film contains silica in the form of stable colloid and so alkali ions or ammonium ions. Furthermore, solvent type coating compositions containing fine silica is very high in the viscosity owing to their structural viscosity, and coating of a uniform thin film is impossible. It can be considered to rupture the structural viscosity by the hydrogen bond of alcohols to reduce the viscosity, but this cannot be applied to systems using a polyisocyanate compound as a curing agent.

As mentioned above, the thin film coated rustprevented steel sheets require ① higher corrosion resistance, ② further improvement in adhesion to a coating (especially, cationically electrodeposited film) formed on the steel sheets, and ③ reduction of baking temperatures (140°-170° C.) for improvement of the working strength of the steel sheets. Various coating compositions have been proposed in order to meet such requirements. The above requirements are especially important to the coating systems using polyisocyanate compounds as curing agents. Since the proposed coating compositions have the problem of thixotropy, there have not yet been obtained any practically usable, organic solvent-soluble epoxy resin coating compositions as the solvent-type compositions or coating compositions containing polyisocyanate compounds or silica powders for the thin film type rust-prevented steel sheets.

SUMMARY OF THE INVENTION

The primary object of the present invention is to provide organic composite-plated steel sheets which are inhibited from liberation of harmful substances such as chromium from the sheets during the surface treatment step conducted by users, and excellent in the corrosion resistance by low-temperature baking of the thin film coating.

DETAILED DESCRIPTION OF PREFERRED EMBODIMENTS

Figure 1:
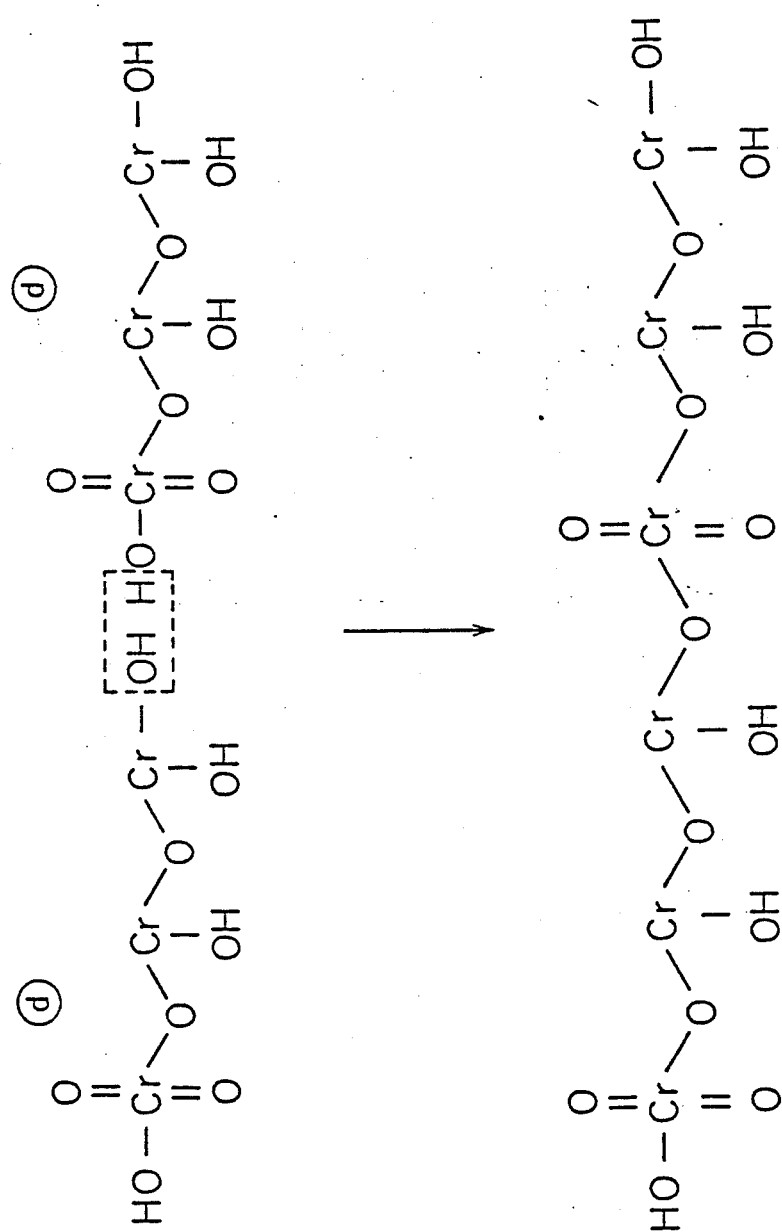
FIG. 1 shows the structure of a chromate film obtained using a chromic acid single bath.

The present inventors have already proposed an organic composite-plated steel sheet in JP-A-1-11830 for the needs as mentioned above. The present invention aims at improvement of the chromate film coated on the organic composite-plated steel sheets to especially improve the corrosion resistance of the steel sheets.

Thus, the present inventors have thought of the necessity to further enhance the hard-solubility of the coated chromate film in order to attain the further enhancement of the corrosion resistance of the organic composite-plated steel sheets having the soluble-type chromate film coated thereon and have made the researches mentioned below.

That is, for rendering the coated chromate film hardly soluble, the conversion of soluble $Cr^{6+}$ ion to hardly soluble $Cr^{3+}$ ion must be fundamentally attained and, for this purpose, researches on reducing agents for $Cr^{6+}$ and on homogeneous reactivity with a primary coat are necessary, and the researches have been conducted on the following:

① the incorporation of phosphoric acid ($H_3PO_4$) and hydrofluoric acid (HF) in a chromate solution for the purposes of inhibiting the liberation of chromium from the coated chromate film, thereby improving the corrosion resistance;

② the total amount of $H_3PO_4$ and HF and the amount of $Cr^{3+}$ ion; and

③ the amounts of $Cr^{6+}$ ion, and $Cr^{3+}$ ion, and the total of Cr ions and the amount of a silane coupling agent.

As a result of the above researches, it has been found that the liberation of chromium can be highly inhibited through the synergistic effect of hydrofluoric acid and phosphoric acid incorporated in the chromate solution coated on the plated surface, reduction of the silane coupling agent on the hexavalent chromium ion in the step of drying the coating solution, and network bonding formed by bonding of the silanol group of the silane coupling agent, whereby high corrosion resistance can be unexpectedly attained depending on the amount of chromate deposited.

First, the method for producing the organic composite-plated steel sheet according to the present invention will be explained below:

(1) A method for producing a highly corrosion resistant organic composite-plated steel sheet which is inhibited from the liberation of chromate, which is characterized by forming a coating-type chromate film as a first layer from a bath composition of the following [A] in an amount of 5-150 mg/m² as solid coated on the surface of a zinc- or zinc alloy-plated o zinc composite alloy-plated steel sheet and then, coating on the first layer an organic solvent-type coating composition of the following [B] as a second layer of a thickness of 0.3-5 μm as solid.

[A] Coating-type chromate bath composition:
① $Cr^{6+}$: 1–30 g/l,
② $Cr^{3+}$: 1–30 g/l,
③ $Cr^{6+}/Cr^{3+}$ weight ratio 0.1–2.0,
④ $HF+H_3PO_4$: 1–60 g/l,
⑤ $HF+H_3PO_4/Cr^{3+}$ weight ratio: 0.5–3.5, and
⑥ Silane coupling agent/$Cr^{6+}$ molar ratio: 0.05–0.3.

[B] Organic solvent-type coating composition:
(A) A bisphenol type epoxy resin having a number-average molecular weight of 300-100,000 in an amount of 30% by weight or more based on the solid content of the coating composition, (B) At least one curing agent selected from the group consisting of polyisocyanate compounds and blocked polyisocyanate compounds at a weight ratio to the epoxy resin solid content of 1/10-20/10, (C) Fumed silica of 0.1-100 mμ in an average particle size in an amount of 5-50% by weight based on the solid content of the coating composition, (D) A ketone type organic solvent in an amount of 40% by weight or more based on the weight of the coating composition.

The solid content of the coating composition is in the range of 10-50% by weight.

(2) In the coating type chromate bath composition [A], at least one compound represented by the following formulas [1] and [2] can be used as the silane coupling agent.

$$(YR)_m SiX_n \quad (1)$$

$$Y_m SiX_n \quad (2)$$

wherein m+n=4 and n is 1-3,
R is an alkyl group,
X is a methoxy group or an ethoxy group, and
Y is a vinyl group, a mercapto group, a glycidoxy group or a methacryloxy group.

(3) ore, the composition [A] can contain Zn ion and/or Ni ion in an amount of 0.1-10 g/l.

(4) Each of the following components can be contained in the coating composition [B] which constitutes the uppermost layer.

① At least one selected from the group consisting of methyl isobutyl ketone, acetone, cyclohexanone, and isophorone as the ketone type organic solvent (D).

② Resol type phenolic resin at a weight ratio to the solid content of curing agent (B) of 10/1-1/10.

③ Polyethylene wax in an amount of 0.1-10% by weight based on the solid content of the coating composition. That is, the essentials of the present invention are as follows:

① The coated chromate layer which constitutes the first layer is characterized by having a network structure formed by bonding with hardly soluble phosphoric acid type chromium and silanol group by employing the phosphoric acid and silane coupling agent, and furthermore, the chromate layer is rendered more hardly soluble by employing HF for the acceleration of homogeneous reactivity at the interface between the chromate layer and the first plated layer, whereby the liberation of chromium is more effectively inhibited.

② The second layer is characterized by being obtained by coating an organic solvent-type coating composition comprising a bisphenol type epoxy resin, polyisocyanate compound, fumed silica and ketone organic solvent, and if necessary for baking at low temperatures, a blocked polyisocyanate compound and, for improvement of the corrosion resistance, ultrafine dry silica (fumed silica) may be contained at high concentrations, respectively.

Furthermore, the present invention is based on the finding that the viscosity of the coating composition can be effectively reduced by adding a ketone organic solvent to a system of bisphenol type epoxy resin/polyisocyanate curing agent/fumed silica, and it is important that the solvent is added, if necessary, together with a lubricant to adjust the solid content of the coating composition to 10–50% by weight.

The plated steel sheets applied to the present invention include electroplated steel sheets such as Zn, Zn—Ni, Zn—Cr—Ni, and Fe—Zn plated sheets and electrodispersion-plated steel sheets such as those plated with metal oxides such as $SiO_2$, $TiO_2$, $Al_2O_3$, $ZrO_2$ and $BaCrO_4$ using Zn-Ni or Zn-Fe as a base.

Furthermore, there may be used dipping plated steel sheets such as galvanized iron sheets, alloy galvanized steel sheets, and Zn—Al alloy plated steel sheets.

There may be used steel sheets plated with zinc, aluminum or alloys thereof or with zinc based composite alloys by known methods.

The criticalities of the constructive matters of the present invention will be explained below.

① The coating type chromate film:

The chromate film used in the present invention which is present between the lower plated layer and the upper coated layer improves the adhesion of the coated layer and this is very important for imparting high corrosion resistance to the organic composite-plated steel sheets. Especially, inhibition of the swelling and dissolution of the film in water, or an alkaline or acidic aqueous solution is essential and, for this purpose, the chromate film must be made hardly soluble to a high level and the bath composition must be limited as follows.

The chromate composition [A] contains water as a solvent and 1–30 g/l of hexavalent chromium ions and 1–30 g/l of trivalent chromium ions as basic components. If the concentration of hexavalent chromium ions or that of trivalent chromium ions is less than 1 g/l, it is difficult to form a chromate film which exhibits satisfactory corrosion resistance. If the concentration of hexavalent chromium ions or that of trivalent chromium ions is more than 30 g/l the viscosity of the chromate solution increases and the stability thereof deteriorates and further the control of the amount of chromium deposited becomes difficult. Regarding the amount of chromium, the ratio of the contents of hexavalent chromium ions and trivalent chromium ions is important, and the weight ratio of hexavalent chromium ions/trivalent chromium ions must be within the range of 0.1–2.0.

If the weight ratio of hexavalent chromium ions and trivalent chromium ions is less than 0.1, the chromate composition readily gels and further the corrosion resistance of the chromate film deteriorates. If the weight ratio is more than 2, the concentration of hexavalent chromium ions increases as such, and when a silane coupling agent is added to the solution, the reduction of the hexavalent chromium ions in the chromate composition with the silane coupling agent becomes easy to occur, resulting in the deterioration of the chromate composition.

Control of the weight ratio of the chromium ions may also be carried out by optionally adding a known reducing agent such as ethanol, methanol, sulfuric acid, starch and sucrose.

As other components, the chromate composition of the present invention must contain totally 1–60 g/l of hydrofluoric acid and phosphoric acid. If the total amount of hydrofluoric acid and phosphoric acid is less than 1.0 g/l, the corrosion resistance and alkali resistance of the chromate film deteriorate and, if the total amount is more than 60 g/l, the reduction of the hexavalent chromium ions in the chromate solution with the silane coupling agent proceeds to cause reduction of the quality required by the chromate composition.

In the total amount of hydrofluoric acid and phosphoric acid, the weight ratio of (fluorine ion + phosphoric acid ion)/trivalent chromium ion is especially important. The ratio of (fluorine ion + phosphoric acid ion)/trivalent chromium ion is preferably within the range of 0.5–3.5. If this ratio is less than 0.5, the alkali resistance and corrosion resistance of the chromate film tend to deteriorate and if this ratio is more than 3.5, the drying properties of the chromate film deteriorates and it readily absorbs moisture to cause the reduction of corrosion resistance of the coating.

The coating type chromate composition of the present invention, if necessary, may contain 0.1–10 g/l of zinc ions and/or 0.1–10 g/l of nickel ions to further improve the alkali resistance and corrosion resistance. If the amount of zinc ions and/or nickel ions is less than 0.1 g/l, there can be seen no effect of improving these properties and, if it is more than 10 g/l, the trivalent chromium ions in the composition readily precipitate, which is undesirable.

Zinc ions may be added to the chromate composition in the form of zinc white, zinc carbonate, zinc hydroxide, zinc phosphate or zinc fluoride, and nickel ions may be added in the form of nickel carbonate, basic nickel carbonate, nickel hydroxide or nickel fluoride.

In coating the chromate composition, a silane coupling agent is previously added to the composition at a molar ratio (molar ratio of silane coupling agent/ hexavalent chromium ion in the chromate composition) of 0.05–0.3.

A the silane coupling agents which are not limitative, preferred are those which are represented by the following formulas [1] and [2].

$$(YR)_m SiX_n \qquad (1)$$

$$Y_m SiX_n \qquad (2)$$

wherein m+n=4 and n is 1–3,

R is an alkyl group,

X is a methoxy group or an ethoxy group, and

Y is a vinyl group, a mercapto group, a glycidoxy group or a methacryloxy group.

As examples of the silane coupling agents, mention may be made of vinyltrimethoxysilane, γ-dimercaptopropyltrimethoxysilane, γ-glycidoxypropyltrimethoxysilane, γ-glycidoxypropylmethyldimethoxysilane, γ-methacryloxypropyltrimethoxysilane, and γ-methacryloxypropylmethyldimethoxysilane.

If the molar ratio of the silane coupling agent is less than 0.05, the effect of improving the alkali resistance of the chromate film is not sufficient and, if it is more than 0.3, there is a tendency of gradual decrease in the stability of the chromate solution, namely, tendency of increase of trivalent chromium ions in the chromate solution, resulting in easy gelation. The molar ratio is more preferably 0.1–0.2.

The chromate composition B of the present invention which contains the silane coupling agent as mentioned above is coated on the surface of the zinc plated-steel sheets, for example, by a roll coater and then dried to form a chromate film in an amount of 10–150 mg/m² in terms of the amount of chromium deposited.

If the amount of chromium in total in terms of metallic chromium is less than 10 mg/m², the corrosion resistance of the film and corrosion resistance of the coated film are insufficient and, if it is more than 150 mg/m², the control of the amount of chromium in the chromate film is difficult and the effect of improving the corrosion resistance is saturated and further improvement cannot be expected and, besides, part of the chromate film is readily removed by an external force to cause reduction of adhesion and deterioration of weldability. Accordingly, the amount of chromium deposited is preferably 20–100 mg/m².

The conditions for drying the chromate film according to the present invention are not critical and the chromate film of sufficient performance can be obtained even by drying at lower than 100° C. and for less than 5 seconds.

Moreover, the pH of the aqueous chromate solution specified by the present invention is also not critical but preferably about 1–3.

The mechanism of the chromate film being rendered hardly soluble according to the present invention may be considered as follows.

In the course of coating an aqueous chromate composition containing a silica sol silane coupling agent on a zinc-plated steel sheet and drying it, trivalent chromium ions, hexavalent chromium ions, hydrofluoric acid and phosphoric acid in the aqueous chromate composition react with the surface of the plating mainly by heat energy in the drying step, resulting in a colorless film component represented by the following (a), green color film components represented by (b) and (c) and gold color film components represented by (d) and (e).

(a) $ZnF_n(OH)_m$ where $n+m=2$, $(n=0-2)$
(b) $Zn_3(PO_4)_2 \cdot 4H_2O$
(c) $NiF_n(OH)_m$ where $n+m=2$, $(n=0-2)$
(b) $Ni_3(PO_4)_2 \cdot 8H_2O$
(e) $CrF_x(OH)_y$ where $n+m=3$, $(n=0-3)$
(f) $CrPO_4 \cdot 6H_2O$
(g) Zinc chromate compounds represented by $ZnO \cdot 3Zn(OH)_2 \cdot CrO_3$, $3Zn(OH)_2 \cdot CrO_3$, $2Zn(OH)_2 \cdot CrO_3$, etc.
(h) $Cr(OH)_3 \cdot Cr(OH) \cdot CrO_4$ (chromic chromate)

Next, the silane coupling agent will be explained. When an agent having trimethoxy group and shown by $YRSi(OCH_3)_3$ is taken as an example of the silane coupling agents, this is hydrolyzed in accordance with the following formula (1).

$$YRSi(OCH_3)_3 + 3H_2O \rightarrow (i)YRSi(OCH_3)_3 + 3CH_3OH \quad (1)$$

Figure 2:
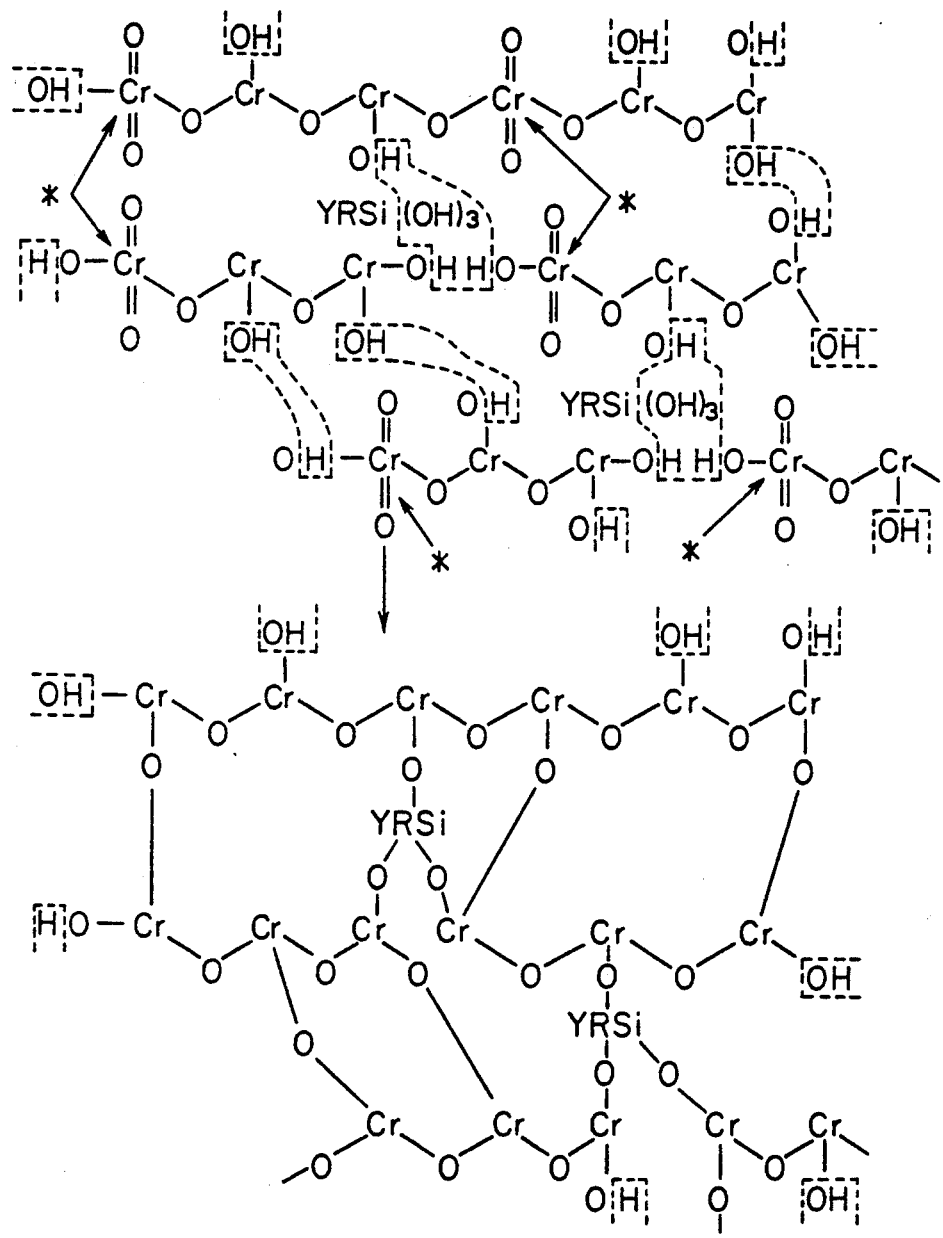
FIG. 2 shows the structure of a chromate film obtained using a mixed bath comprising chromic acid and a silane coupling agent.

In such a chromate solution, even if the drying conditions are low for the temperature and short for the time, for example, the chromic chromate of the above (h) further causes condensation reaction with group as shown in FIG. 1 and, further, the chromic chromate crosslinks with the hydrolysis component (i) of the silane coupling agent as shown in FIG. 2 and methanol reduces hexavalent chromium ions in the chromic chromate.

Thus, it is considered that a chromic chromate forms complicated bonds with hydrolyzates of the silane coupling agent to form a pair of network polymer structures.

Therefore, it is considered that each of the components (a), (b), (c), (d), (e), (f) and (g) is present in the network structure of a polymeric chromium compound shown in FIGS. 1 and 2 in such a state that they are blocked therein or they are bonded to the polymeric chromium compound.

The chromate film having the network molecular structure thus formed is high in the alkali resistance with addition of the bonding effect of the silanol group, namely, chromium in the film is liberated with difficulty. It is considered that the network molecular structure further contributes to improvement of the corrosion resistance. Furthermore, since this film does not contain any organic polymer compounds, a betweenlayers insulation resistance is relatively low and so this advantageously acts on welding resistance.

② Organic solvent-type coating film:

The epoxy binder resin (A) used for the formation of organic coat in the present invention is of an organic solvent-dissolving type superior in water resistance and alkali resistance and especially excellent in adhesion to the base and overcoat, and a bisphenol type epoxy resin having a number-average molecular weight of 300–100,000 is used.

For example, some resins represented by the following formula may be used.

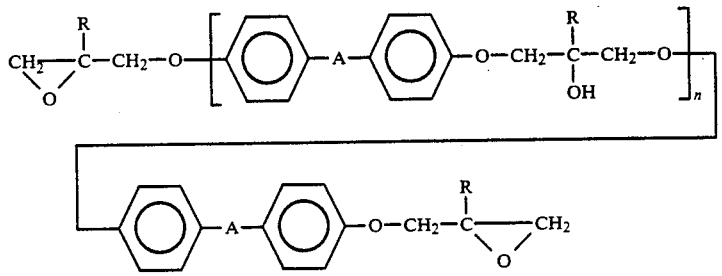

wherein R is H or $CH_3$; $-A-$ is $>C(CH_3)_2$, $-CH_2-$, $-O-$,

or $-S-$.

When $-A-$ in the above formula is $>C(CH_3)_2$, especially preferable results can be obtained. If the number-average molecular weight is less than 300, polymerization cannot be sufficiently attained by the reaction and corrosion resistance of the coat is insufficient. If it is more than 100,000, the crosslinking reaction does not sufficiently proceed and the corrosion resistance is also insufficient.

The amount of the bisphenol type epoxy resin (A) must be at least 30% by weight based on the solid content of the coating composition. If it is less than 30% by weight, the action as the binder of the resin on dry silica reduces to make it difficult to form a coating composition and result in a coat which is brittle and insufficient in processing adhesion.

Curing agent.(B) comprises a polyisocyanate compound and/or a blocked polyisocyanate compound.

As examples of the polyisocyanate compound, mention may be made of aliphatic or alicyclic diisocyanate compounds such as hexamethylene diisocyanate, isophorone diisocyanate and hydrogenated diphenylmethane diisocyanate, aromatic diisocyanate compounds such as tolylene diisocyanate and diphenylmethane-4,4'-diisocyanate, and triisocyanate compounds such as adducts of 1 mol of trimethylolpropane and 3 mols of the above diisocyanate and trimers of diisocyanates such as hexamethylene diisocyanate and tolylene diisocyanate. These may be used singly or in combination of two or more.

The blocked polyisocyanate compounds are, for example, those which are the above isocynates blocked with a blocking agent and the blocking agent must be such that the adducts produced by adding to the isocyanate group are stable at room temperature and dissociate upon baking of coat to reproduce free isocyanate group.

Examples of the blocking agent are lactam blocking agents such as ε-caprolactam and γ-butyrolactam, oxime blocking agents such as methyl ethyl ketoxime and cyclohexanone oxime, alcoholic blocking agents such as methanol, ethanol and isobutyl alcohol, phenolic blocking agents such as phenol, p-tertbutylphenol and cresol, and ester blocking agents such as ethyl acetoacetate and methyl acetoacetate. Especially preferred are methyl ethyl ketoxime and ethyl acetoacetate which dissociate at low temperatures and are stable in the state of storing the coating composition.

The amount of the curing agent (B) is in the range of 1/10-20/10 in the weight ratio to the solid content of the epoxy resin (A), and (A) and (B) react for a short time at a low temperature to give a suitable vehicle system. For example, the reaction sufficiently proceeds under the baking conditions of a maximum ultimate temperature of lower than 160° C. for the material to be coated and a baking time of about 5-60 seconds. If the mixing ratio (B)/(A) is less than 1/10, the crosslinking reaction insufficiently proceeds, and the corrosion resistance of the film is not enough and, if it is more than 20/10, the water resistance and alkali resistance deteriorate, and the adhesion to overcoat is insufficient.

Furthermore, resol type phenolic resins may be used in combination with the above curing agent, and this is effective for acceleration of the film forming reaction at the baking at a lower temperature (the maximum ultimate sheet temperature: about 100°-130° C.). Especially preferred resol type phenolic resins are those which are represented by the following formula:

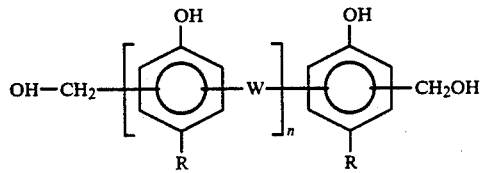

wherein n is 0-4; W is —$CH_2$— or —$CH_2$—O—$CH_2$—; R is $CH_3$, H or

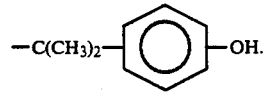

The amount of the resol-type phenolic resin added is preferably in the range of 10/1-1/10 in the weight ratio to the solid content of the curing agent (B). If the amount is more than 10/1, the alkali resistance is insufficient and, if it is less than 1/10, no reaction acceleration effect is recognized.

Further, in the present invention, fumed silica (C) of 0.1-100 mμ in average particle size is used in an amount of 5-50% by weight in the solid content of the coating composition to impart a high corrosion resistance without causing the liberation of harmful materials into decreasing and film-forming baths. If the particle size is less than 0.1 mμ as primary particles of silica particles, the alkali resistance and adhesion to the overcoat film decrease and are insufficient and, if it exceeds 100 mμ, the corrosion resistance decreases and the smoothness of the electrodeposited coat also deteriorates. Therefore, the average particle size of the silica particles is in the range of 0.1-100 mμ, preferably 5-40 mμ. The amount of the fumed silica (C) is suitably in the range of 5-50% by weight, preferably 15-30% by weight of the solid content of the coating composition. Use of fumed silica (C) in such a large amount has become possible by the use of the above ketone-type organic solvent (D). If the amount of fumed silica (C) is less than 5% by weight, the corrosion resistance is insufficient and, if it is more than 50% by weight, the processing adhesion of the coat or spot weldability deteriorate and further the composition becomes highly viscous and it becomes difficult to uniformly coat the composition on the thin film.

In the present invention, the above-mentioned components are dissolved or dispersed in an organic solvent to obtain the coating composition. As the organic solvent, ketone type organic solvent (D) is contained in an amount of at least 40% by weight of the coating composition and, in addition, the solid concentration of the coating composition is adjusted to 10-50% by weight, whereby a uniform thin film can easily be formed. If the solid concentration of the coating composition is less than 10%, the content of the solvent is too high and this is uneconomical. If it exceeds 50%, it becomes difficult to uniformly form the thin film and thus there are difficulties in the coating operation.

Examples of the especially preferred ketone type organic solvents are methyl isobutyl ketone, acetone, cyclohexanone, and isophorone. If necessary, other solvents may be used in combination, but use of the solvents which react with polyisocyanate compounds such as water and alcohols should be avoided.

Relation between the solvent and the fumed silica will be explained in detail below.

That is, when the content of the fumed silica based on the solid content of the coating composition is increased so as to secure high corrosion resistance, the concentration of the coating composition is extremely high and the composition tends to agglomerate, and it becomes difficult to uniformly coat the coating composition and especially, it is almost impossible to uniformly form a thin film (a few micron). Therefore, hitherto, solvents high in a degree of hydrogen bonding, such as water and alcoholic solvents, have been used for a reducing viscosity, but it is difficult to obtain a coat having sufficient quality to attain the object of the present invention, because the resins which can be dissolved are limited and any isocyanate compounds cannot be used and thus, a degree of freedom for design of blending a coating composition is low. In the present invention, as mentioned above, the addition of fumed silica in a high concentration becomes possible and further a bisphenol type epoxy resin and polyisocyanate compound which form a strong coat film at low temperatures can be stably dissolved by using ketone type organic solvents and thus, the object of the present invention can be attained.

Next, from the viewpoint of the press workability of rust-proofed steel sheets, in addition to the polyolefinic lubricants, there may also be used lubricants of a carboxylic ester type, carboxylic acid metal salt type or polyalkylene glycol type, and lubricant powders of molybdenum disulfide, silicon compounds and fluorine compounds in the coating composition of the present invention. It is preferred to use them in an amount of 0.1-10% by weight based on the solid content of the coating composition to further improve the workability. Especially preferred is a polyethylene wax having a density of at least 0.94, a molecular weight of 1000-10000, and an acid value of 15 KOH mg/g or less. If the amount of the wax added is less than 0.1% by weight, the frictional resistance of the surface of the coating film is high and, hence, there occur scoring or peeling of the coat. This is practically not acceptable. On the other hand, if the amount is more than 10% by weight, the shrinkage marks of the lubricant occur in a water-cooling zone after baking of the coat to cause damage of appearance in finished coat. Thus, use of such an amount should be avoided.

If the acid value of the wax is more than 15 KOH mg/g, the wax melts into the coating film and lubricating effect of the film decreases. Therefore, the acid value must be 15 KOH mg/g or less and thus, a layer of the wax is formed on the surface of the coating film, resulting in a high lubricating effect. This wax layer is apt to be formed in depressed portions of the coating film and the portions serve as the points through which current film and the portions serve as the points through which current passes and inhibit formation of defects in the coating film such as gas pin holes and craters in cationic electrodeposition employed for coating of automobiles. Thus, beautiful appearance of electrodeposited coat can stably be obtained.

From the above, the amount of the lubricant in the coating composition is preferably in the range of 0.3-3% by weight.

In the coating composition of the present invention, if the thickness of the coating film as solid film is less than 0.3 $\mu$m, the corrosion resistance is insufficient and, if it is more than 5 $\mu$m, the spot weldability and appearance of electrodeposited coat are damaged. Practically preferred is a thickness of 0.5-2 $\mu$m.

In the organic composite-plated steel sheet of the present invention, the following various pigments may be used in the coating composition which forms the organic solvent type coat of the uppermost layer in order to further enhance the function of the coating film. There may be added rust-proofing pigments, such as chromate pigments, especially, a zinc salt, lead salt and barium salt low in solubility, phosphate pigments, and plumbate pigments; extender pigments, such as carbonate pigments and silicate pigments; colored pigments, such as titanium oxide and carbon; rustproofing agents, such as amine compounds and phenolic carboxylic acids, and dispersion stabilizers. It is desirable to adjust the average particle size to 10 $\mu$m or less, taking the spot weldability and press workability into full consideration.

The conditions for baking the coating film of the coating composition used in the present invention have no special limitations, but the baking of the coating film for a short period with keeping the good properties of the film is possible when a temperature of 100-200° C. is employed as the final temperature for baking the sheet. Coating can be carried out by any known methods such as roll coating, curtain flow coating and others.

According to the present invention, problems in the quality of the conventional organic composite-plated steel sheets are solved by greatly improving press workability and spot weldability and furthermore, the electrodeposition coatability and corrosion resistance are also improved and thus, the organic composite-plated steel sheet of the present invention is an epock-making steel sheet which fully meets the demand of market.

The present invention will be explained in more detail with reference to the following examples.

EXAMPLES

A low carbon steel sheet of 0.8 mm thick was subjected to the zinc alloy plating or molten aluminum dipping as shown in Table 1 by a conventional plating method and immediately thereafter, was subjected to the given chromate treatment by a reverse roll coater to form the first layer and the sheet was dried in such a manner that the maximum sheet temperature reached 60° C. in 5 seconds in a continuous line.

Subsequently, the coating composition as specified in Table 1 was coated on one side of the sheet in a given thickness by roll coating. Immediately thereafter the coated sheet was subjected to the baking treatment so that the maximum ultimate sheet temperature reached 150° C. in 20 seconds. The properties of the resulting coated sheet are shown in Table 1. The mixing ratio of the coating composition is shown by % by weight.

First, the role of the bath composition for making the coated chromate film hardly soluble and the effect of the amount deposited are shown in Example Nos. 1-94. Among them, as comparative examples, Nos. 22-23 are on $Cr^{6+}/Cr^{3+}$, Nos. 40-41 are on phosphoric acid and hydrofluoric acid, Nos. 52-53 are on the silane coupling agent, Nos. 73-74 are on $Zn^{2+}$ and $Ni^{2+}$, and Nos. 93-94 are on the amount of chromium deposited.

From the results, it is clear that the chromate film between the coating film and the plating layer must be hardly soluble in water for improvement of the various properties such as corrosion resistance and others and the amount deposited is preferably within the range of the present invention from the points of properties and cost.

Next, factors for the coating film will be explained. With reference to the proper molecular weight and the amount of the main resin, the examples of the present invention are shown in Nos. 27 and 95-97 and comparative examples are shown in Nos. 98-99.

From the results, it can be seen that epoxy resins are preferred as the main resin and if the molecular weight thereof is too high, this is not effective for the corrosion resistance and press workability, and the molecular weight is preferably 4000 or less. The amount of the main resin is preferably in the range of 30-50% by weight.

As the curing agent for the resin, those of hexamethylene diisocyanate are preferred and hexamethylene diisocyanate curing agents in which the isocyanate group (—NCO) is blocked with ethyl acetoacetate or ε-caprolactam are more preferred from the points of pot life of coating composition and coating operation as shown in Nos. 100-106 and 27 of the present invention and Nos. 107-108 as comparative examples. It is also clear that the amount of the curing agent is suitably in the range of 1-20, preferably 3-10 per 10 of the main resin in order for the sufficient film strength being exhibited in view of the quality obtained by low temperature baking.

Furthermore, the high rust proofness of the organic composite-plated steel sheet of the present invention is attained mainly by the fumed silica in the coating film and the amount and proper particle size thereof are shown in Nos. 27 and 109-117 of the present invention and Nos. 118-120 as comparative examples. It can be seen from the results that the fumed silica is preferably of fine particles and improvement of water swelling resistance and corrosion resistance can be attained by adding them in an amount within the range of the present invention.

Next, with reference to the lubricants used in the coating film, polyethylene lubricants were mainly studied and the results are shown in Nos. 27 and 121-126 of the present invention and Nos. 127-128 as comparative examples. With reference to the amount of the polyethylene lubricant, press workability (powdering) will have no problems in practical use even if this is not added, but it is preferred to add the lubricant in the amount as specified in the present invention for further reducing the frictional resistance of the coating film and maintaining acceptable workability without occurrence of scoring. If the amount of the lubricant is too large, the water swelling resistance of the coating film decreases, resulting in deterioration of the corrosion resistance.

With reference to proper organic solvents, Nos. 27 and 129 are given as examples of the present invention and Nos. 130-131 are given as comparative examples.

As the organic solvents used in the present invention, ketone-type solvents may be used in combination. Use of water or alcoholic solvents should be avoided because these lack compatibility with the polyisocyanate curing agent to cause difficulty in coating operation and quality.

With reference to the proper thickness of the coating film, Nos. 27 and 132-138 are given as examples of the present invention and Nos. 139-140 as comparative examples. As is clear from the results, the range of thickness specified in the present invention is necessary from the points of corrosion resistance and spot weldability. Nos. 27 and 75-83 show the examples of the present invention in which the plating layer was changed. It can be seen that the method of the present invention can be satisfactorily applied to various plating systems.

TABLE 1

| | | Plating *1 | | Coated chromate film | | | | | |
| | | | | Bath composition *2 | | | | | |
| | No. | Plating system | Deposited amount g/m² | $Cr^{6+}$ g/l | $Cr^{3+}$ g/l | $\frac{Cr^{6+}}{Cr^{3+}}$ | $H_3PO_4 + HF$ g/l | $\frac{H_3PO_4 + HF}{Cr^{3+}}$ | Silane coupling agent/ $Cr^{6+}$ mol ratio |
|---|---|---|---|---|---|---|---|---|---|
| Example | 1 | Zn-11% Ni alloy electroplating | 20 | 1 | 1 | 1.0 | 1.0 | 1.0 | 0.1 |
| " | 2 | Zn-11% Ni alloy electroplating | " | " | 5 | 0.2 | 4.5 | 0.9 | " |
| " | 3 | Zn-11% Ni alloy electroplating | " | 2.5 | " | 0.5 | " | " | " |
| " | 4 | Zn-11% Ni alloy electroplating | " | 5 | " | 1.0 | " | " | " |
| " | 5 | Zn-11% Ni alloy electroplating | " | 10 | " | 2.0 | " | " | " |
| " | 6 | Zn-11% Ni alloy electroplating | " | 1 | 10 | 0.1 | 9.0 | " | " |
| " | 7 | Zn-11% Ni alloy electroplating | " | 3 | " | 0.3 | " | " | " |
| " | 8 | Zn-11% Ni alloy electroplating | " | 5 | " | 0.5 | " | " | " |
| " | 9 | Zn-11% Ni alloy electroplating | " | 10 | " | 1.0 | " | " | " |
| " | 10 | Zn-11% Ni alloy electroplating | " | 15 | " | 1.5 | " | " | " |
| " | 11 | Zn-11% Ni alloy electroplating | " | 20 | " | 2.0 | " | " | " |
| " | 12 | Zn-11% Ni alloy electroplating | " | 2 | 20 | 0.1 | 18.0 | " | " |
| " | 13 | Zn-11% Ni alloy electroplating | " | 6 | " | 0.3 | " | " | " |
| " | 14 | Zn-11% Ni alloy electroplating | " | 10 | " | 0.5 | " | " | " |
| " | 15 | Zn-11% Ni alloy electroplating | " | 20 | " | 1.0 | " | " | " |
| " | 16 | Zn-11% Ni alloy electroplating | " | 30 | " | 1.5 | " | " | " |
| " | 17 | Zn-11% Ni alloy electroplating | " | 3 | 30 | 0.1 | 27.0 | " | " |
| " | 18 | Zn-11% Ni alloy electroplating | " | 9 | " | 0.3 | " | " | " |
| Example | 19 | Zn-11% Ni alloy electroplating | 20 | 15 | 30 | 0.5 | 27.0 | 0.9 | 0.1 |
| " | 20 | Zn-11% Ni alloy | " | 21 | " | 0.7 | " | " | " |

TABLE 1-continued

| Type | No. | Plating | | | | | | | |
|---|---|---|---|---|---|---|---|---|---|
| " | 21 | Zn-11% Ni alloy electroplating | " | 30 | " | 1.0 | " | " | " |
| Comparative Example | 22 | Zn-11% Ni alloy electroplating | " | 0.25 | 5 | 0.05 | 4.5 | " | " |
| Comparative Example | 23 | Zn-11% Ni alloy electroplating | " | 15 | " | 3.0 | " | " | " |
| Example | 24 | Zn-11% Ni alloy electroplating | " | 7 | 6 | 1.2 | 3.0 | 0.5 | " |
| " | 25 | Zn-11% Ni alloy electroplating | " | " | " | " | 4.2 | 0.7 | " |
| " | 26 | Zn-11% Ni alloy electroplating | " | " | " | " | 6.0 | 1.0 | " |
| " | 27 | Zn-11% Ni alloy electroplating | " | " | " | " | 8.4 | 1.4 | " |
| " | 28 | Zn-11% Ni alloy electroplating | " | " | " | " | 10.2 | 1.7 | " |
| " | 29 | Zn-11% Ni alloy electroplating | " | " | " | " | 12.0 | 2.0 | " |
| " | 30 | Zn-11% Ni alloy electroplating | " | " | " | " | 15.0 | 2.5 | " |
| " | 31 | Zn-11% Ni alloy electroplating | " | " | " | " | 18.0 | 3.0 | " |
| " | 32 | Zn-11% Ni alloy electroplating | " | " | " | " | 21.0 | 3.5 | " |
| " | 33 | Zn-11% Ni alloy electroplating | " | 21 | " | 17 | 8.5 | 0.5 | " |
| " | 34 | Zn-11% Ni alloy electroplating | " | " | 17 | " | 17.0 | 1.0 | " |
| " | 35 | Zn-11% Ni alloy electroplating | " | " | " | " | 25.5 | 1.5 | " |
| Example | 36 | Zn-11% Ni alloy electroplating | 20 | 21 | 17 | 1.2 | 34.0 | 2.0 | 0.1 |
| " | 37 | Zn-11% Ni alloy electroplating | " | " | " | " | 42.5 | 2.5 | " |
| " | 38 | Zn-11% Ni alloy electroplating | " | " | " | " | 51.0 | 3.0 | " |
| " | 39 | Zn-11% Ni alloy electroplating | " | " | " | " | 59.5 | 3.5 | " |
| Comparative Example | 40 | Zn-11% Ni alloy electroplating | " | 7 | 6 | " | 0.5 | 0.1 | " |
| Comparative Example | 41 | Zn-11% Ni alloy electroplating | " | 21 | 17 | " | 85.0 | 5.0 | " |
| Example | 42 | Zn-11% Ni alloy electroplating | " | 7 | 6 | " | 8.4 | 1.4 | 0.05 |
| " | 43 | Zn-11% Ni alloy electroplating | " | " | " | " | " | " | 0.07 |
| " | 44 | Zn-11% Ni alloy electroplating | " | " | " | " | " | " | 0.12 |
| " | 45 | Zn-11% Ni alloy electroplating | " | " | " | " | " | " | 0.15 |
| " | 46 | Zn-11% Ni alloy electroplating | " | " | " | " | " | " | 0.17 |
| " | 47 | Zn-11% Ni alloy electroplating | " | " | " | " | " | " | 0.20 |
| " | 48 | Zn-11% Ni alloy electroplating | " | " | " | " | " | " | 0.22 |
| " | 49 | Zn-11% Ni alloy electroplating | " | " | " | " | " | " | 0.25 |
| " | 50 | Zn-11% Ni alloy electroplating | " | " | " | " | " | " | 0.27 |
| Example | 51 | Zn-11% Ni alloy electroplating | 20 | 7 | 6 | 1.2 | 8.4 | 1.4 | 0.30 |
| Comparative Example | 52 | Zn-11% Ni alloy electroplating | " | " | " | " | " | " | 0.01 |
| Comparative Example | 53 | Zn-11% Ni alloy electroplating | " | " | " | " | " | " | 0.5 |
| Example | 54 | Zn-11% Ni alloy electroplating | " | " | " | " | " | " | 0.1 |
| " | 55 | Zn-11% Ni alloy electroplating | " | " | " | " | " | " | " |
| " | 56 | Zn-11% Ni alloy electroplating | " | " | " | " | " | " | " |
| " | 57 | Zn-11% Ni alloy electroplating | " | " | " | " | " | " | " |
| " | 58 | Zn-11% Ni alloy electroplating | " | " | " | " | " | " | " |
| " | 59 | Zn-11% Ni alloy electroplating | " | " | " | " | " | " | " |
| " | 60 | Zn-11% Ni alloy electroplating | " | " | " | " | " | " | " |
| " | 61 | Zn-11% Ni alloy electroplating | " | " | " | " | " | " | " |

TABLE 1-continued

| | | | | | | | | | |
|---|---|---|---|---|---|---|---|---|---|
| " | 62 | Zn-11% Ni alloy electroplating | " | " | " | " | " | " | " |
| " | 63 | Zn-11% Ni alloy electroplating | " | " | " | " | " | " | " |
| " | 64 | Zn-11% Ni alloy electroplating | " | " | " | " | " | " | " |
| " | 65 | Zn-11% Ni alloy electroplating | " | " | " | " | " | " | " |
| " | 66 | Zn-11% Ni alloy electroplating | " | " | " | " | " | " | " |
| " | 67 | Zn-11% Ni alloy electroplating | " | " | " | " | " | " | " |
| Example | 68 | Zn-11% Ni alloy electroplating | 20 | 7 | 6 | 1.2 | 8.4 | 1.4 | 0.1 |
| " | 69 | Zn-11% Ni alloy electroplating | " | " | " | " | " | " | " |
| " | 70 | Zn-11% Ni alloy electroplating | " | " | " | " | " | " | " |
| " | 71 | Zn-11% Ni alloy electroplating | " | " | " | " | " | " | " |
| " | 72 | Zn-11% Ni alloy electroplating | " | " | " | " | " | " | " |
| Comparative Example | 73 | Zn-11% Ni alloy electroplating | " | " | " | " | " | " | " |
| Comparative Example | 74 | Zn-11% Ni alloy electroplating | " | " | " | " | " | " | " |
| Example | 75 | Zn electroplating | " | " | " | " | " | " | " |
| " | 76 | Zn—Cr—Ni alloy electroplating | " | " | " | " | " | " | " |
| " | 77 | Zn—Fe alloy electroplating | " | " | " | " | " | " | " |
| " | 78 | Dipped Zn plating | " | " | " | " | " | " | " |
| " | 79 | Dipped Zn—Fe alloy plating | " | " | " | " | " | " | " |
| " | 80 | Dipped Zn—55Al-0.1 mg alloy plating | " | " | " | " | " | " | " |
| Example | 81 | Dipped Zn—55Al alloy plating | 20 | 7 | 6 | 1.2 | 8.4 | 1.4 | 0.1 |
| " | 82 | Zn—Ni—SiO$_2$ alloy electroplating | " | " | " | " | " | " | " |
| " | 83 | Zn—Ni—BaCrO$_4$ alloy electroplating | " | " | " | " | " | " | " |
| " | 84 | Zn-11% Ni alloy electroplating | " | " | " | " | " | " | " |
| " | 85 | Zn-11% Ni alloy electroplating | " | " | " | " | " | " | " |
| " | 86 | Zn-11% Ni alloy electroplating | " | " | " | " | " | " | " |
| " | 87 | Zn-11% Ni alloy electroplating | " | " | " | " | " | " | " |
| " | 88 | Zn-11% Ni alloy electroplating | " | " | " | " | " | " | " |
| " | 89 | Zn-11% Ni alloy electroplating | " | " | " | " | " | " | " |
| " | 90 | Zn-11% Ni alloy electroplating | " | " | " | " | " | " | " |
| " | 91 | Zn-11% Ni alloy electroplating | " | " | " | " | " | " | " |
| " | 92 | Zn-11% Ni alloy electroplating | " | " | " | " | " | " | " |
| Comparative Example | 93 | Zn-11% Ni alloy electroplating | " | " | " | " | " | " | " |
| Comparative Example | 94 | Zn-11% Ni alloy electroplating | " | " | " | " | " | " | " |
| Example | 95 | Zn-11% Ni alloy electroplating | 20 | 7 | 6 | 1.2 | 8.4 | 1.4 | 0.1 |
| " | 96 | Zn-11% Ni alloy electroplating | " | " | " | " | " | " | " |
| " | 97 | Zn-11% Ni alloy electroplating | " | " | " | " | " | " | " |
| Comparative Example | 98 | Zn-11% Ni alloy electroplating | " | " | " | " | " | " | " |
| Comparative Example | 99 | Zn-11% Ni alloy electroplating | " | " | " | " | " | " | " |
| Example | 100 | Zn-11% Ni alloy electroplating | " | " | " | " | " | " | " |
| " | 101 | Zn-11% Ni alloy electroplating | " | " | " | " | " | " | " |
| " | 102 | Zn-11% Ni alloy electroplating | " | " | " | " | " | " | " |
| " | 103 | Zn-11% Ni alloy | " | " | " | " | " | " | " |

TABLE 1-continued

|  | No. | | | | | | | | |
|---|---|---|---|---|---|---|---|---|---|
| " | 104 | Zn-11% Ni alloy electroplating | " | " | " | " | " | " | " |
| Example | 105 | Zn-11% Ni alloy electroplating | 20 | 7 | 6 | 1.2 | 8.4 | 1.4 | 0.1 |
| " | 106 | Zn-11% Ni alloy electroplating | " | " | " | " | " | " | " |
| Comparative Example | 107 | Zn-11% Ni alloy electroplating | " | " | " | " | " | " | " |
| Comparative Example | 108 | Zn-11% Ni alloy electroplating | " | " | " | " | " | " | " |
| Example | 109 | Zn-11% Ni alloy electroplating | " | " | " | " | " | " | " |
| " | 110 | Zn-11% Ni alloy electroplating | " | " | " | " | " | " | " |
| " | 111 | Zn-11% Ni alloy electroplating | " | " | " | " | " | " | " |
| " | 112 | Zn-11% Ni alloy electroplating | " | " | " | " | " | " | " |
| " | 113 | Zn-11% Ni alloy electroplating | " | " | " | " | " | " | " |
| " | 114 | Zn-11% Ni alloy electroplating | " | " | " | " | " | " | " |
| " | 115 | Zn-11% Ni alloy electroplating | " | " | " | " | " | " | " |
| " | 116 | Zn-11% Ni alloy electroplating | " | " | " | " | " | " | " |
| " | 117 | Zn-11% Ni alloy electroplating | " | " | " | " | " | " | " |
| Comparative Example | 118 | Zn-11% Ni alloy electroplating | 20 | 7 | 6 | 1.2 | 8.4 | 1.4 | 0.1 |
| Comparative Example | 119 | Zn-11% Ni alloy electroplating | " | " | " | " | " | " | " |
| Comparative Example | 120 | Zn-11% Ni alloy electroplating | " | " | " | " | " | " | " |
| Example | 121 | Zn-11% Ni alloy electroplating | " | " | " | " | " | " | " |
| " | 122 | Zn-11% Ni alloy electroplating | " | " | " | " | " | " | " |
| " | 123 | Zn-11% Ni alloy electroplating | " | " | " | " | " | " | " |
| " | 124 | Zn-11% Ni alloy electroplating | " | " | " | " | " | " | " |
| " | 125 | Zn-11% Ni alloy electroplating | " | " | " | " | " | " | " |
| " | 126 | Zn-11% Ni alloy electroplating | " | " | " | " | " | " | " |
| Comparative Example | 127 | Zn-11% Ni alloy electroplating | " | " | " | " | " | " | " |
| Comparative Example | 128 | Zn-11% Ni alloy electroplating | " | " | " | " | " | " | " |
| Example | 129 | Zn-11% Ni alloy electroplating | " | " | " | " | " | " | " |
| Comparative Example | 130 | Zn-11% Ni alloy electroplating | 20 | 7 | 6 | 1.2 | 8.4 | 1.4 | 0.1 |
| Comparative Example | 131 | Zn-11% Ni alloy electroplating | " | " | " | " | " | " | " |
| Example | 132 | Zn-11% Ni alloy electroplating | " | " | " | " | " | " | " |
| " | 133 | Zn-11% Ni alloy electroplating | " | " | " | " | " | " | " |
| " | 134 | Zn-11% Ni alloy electroplating | " | " | " | " | " | " | " |
| " | 135 | Zn-11% Ni alloy electroplating | " | " | " | " | " | " | " |
| " | 136 | Zn-11% Ni alloy electroplating | " | " | " | " | " | " | " |
| " | 137 | Zn-11% Ni alloy electroplating | " | " | " | " | " | " | " |
| " | 138 | Zn-11% Ni alloy electroplating | " | " | " | " | " | " | " |
| Comparative Example | 139 | Zn-11% Ni alloy electroplating | " | " | " | " | " | " | " |
| Comparative Example | 140 | Zn-11% Ni alloy electroplating | " | " | " | " | " | " | " |

| | | | | Organic solvent type coating film | | | | | | |
|---|---|---|---|---|---|---|---|---|---|---|
| | | | T.Cr Deposited amount mg/m² | Main resin *3 | | | Curing agent *4 | | Fumed silica *5 | | *6 Amount of lubricant % |
| No. | Zn²⁺ g/l | Ni²⁺ g/l | | Type | Molecular weight | Amount % | Type | Mixing ratio | Average particle size mμ | Amount % | |

TABLE 1-continued

| | | | | | | | | | | | | |
|---|---|---|---|---|---|---|---|---|---|---|---|---|
| Example | 1 | 0 | 0 | 40 | Epoxy | 2900 | 48.7 | HMDI-AEA | 5/10 | Aerosil 300, 8 | 25 | 2 |
| " | 2 | " | " | " | " | " | " | " | " | Aerosil 300, 8 | " | " |
| " | 3 | " | " | " | " | " | " | " | " | Aerosil 300, 8 | " | " |
| " | 4 | " | " | " | " | " | " | " | " | Aerosil 300, 8 | " | " |
| " | 5 | " | " | " | " | " | " | " | " | Aerosil 300, 8 | " | " |
| " | 6 | " | " | " | " | " | " | " | " | Aerosil 300, 8 | " | " |
| " | 7 | " | " | " | " | " | " | " | " | Aerosil 300, 8 | " | " |
| " | 8 | " | " | " | " | " | " | " | " | Aerosil 300, 8 | " | " |
| " | 9 | " | " | " | " | " | " | " | " | Aerosil 300, 8 | " | " |
| " | 10 | " | " | " | " | " | " | " | " | Aerosil 300, 8 | " | " |
| " | 11 | " | " | " | " | " | " | " | " | Aerosil 300, 8 | " | " |
| " | 12 | " | " | " | " | " | " | " | " | Aerosil 300, 8 | " | " |
| " | 13 | " | " | " | " | " | " | " | " | Aerosil 300, 8 | " | " |
| " | 14 | " | " | " | " | " | " | " | " | Aerosil 300, 8 | " | " |
| " | 15 | " | " | " | " | " | " | " | " | Aerosil 300, 8 | " | " |
| " | 16 | " | " | " | " | " | " | " | " | Aerosil 300, 8 | " | " |
| " | 17 | " | " | " | " | " | " | " | " | Aerosil 300, 8 | " | " |
| " | 18 | " | " | " | " | " | " | " | " | Aerosil 300, 8 | " | " |
| Example | 19 | 0 | 0 | 40 | Epoxy | 2900 | 48.7 | HMDI-AEA | 5/10 | Aerosil, 300, 8 | 25 | 2 |
| " | 20 | " | " | " | " | " | " | " | " | Aerosil 300, 8 | " | " |
| " | 21 | " | " | " | " | " | " | " | " | Aerosil 300, 8 | " | " |
| Comparative Example | 22 | " | " | " | " | " | " | " | " | Aerosil 300, 8 | " | " |
| Comparative Example | 23 | " | " | " | " | " | " | " | " | Aerosil 300, 8 | " | " |
| Example | 24 | " | " | " | " | " | " | " | " | Aerosil 300, 8 | " | " |
| " | 25 | " | " | " | " | " | " | " | " | Aerosil 300, 8 | " | " |
| " | 26 | " | " | " | " | " | " | " | " | Aerosil 300, 8 | " | " |
| " | 27 | " | " | " | " | " | " | " | " | Aerosil 300, 8 | " | " |
| " | 28 | " | " | " | " | " | " | " | " | Aerosil 300, 8 | " | " |
| " | 29 | " | " | " | " | " | " | " | " | Aerosil 300, 8 | " | " |
| " | 30 | " | " | " | " | " | " | " | " | Aerosil 300, 8 | " | " |
| " | 31 | " | " | " | " | " | " | " | " | Aerosil 300, 8 | " | " |
| " | 32 | " | " | " | " | " | " | " | " | Aerosil 300, 8 | " | " |
| " | 33 | " | " | " | " | " | " | " | " | Aerosil 300, 8 | " | " |
| " | 34 | " | " | " | " | " | " | " | " | Aerosil 300, 8 | " | " |
| " | 35 | " | " | " | " | " | " | " | " | Aerosil 300, 8 | " | " |
| Example | 36 | 0 | 0 | 40 | Epoxy | 2900 | 48.7 | HMDI-AEA | 5/10 | Aerosil 300, 8 | 25 | 2 |
| " | 37 | " | " | " | " | " | " | " | " | Aerosil 300, 8 | " | " |
| " | 38 | " | " | " | " | " | " | " | " | Aerosil 300, 8 | " | " |
| " | 39 | " | " | " | " | " | " | " | " | Aerosil 300, 8 | " | " |
| Comparative Example | 40 | " | " | " | " | " | " | " | " | Aerosil 300, 8 | " | " |
| Comparative Example | 41 | " | " | " | " | " | " | " | " | Aerosil 300, 8 | " | " |

TABLE 1-continued

| | | | | | | | | | | | | |
|---|---|---|---|---|---|---|---|---|---|---|---|---|
| Example | 42 | " | " | " | " | " | " | " | " | Aerosil 300, 8 | " | " |
| " | 43 | " | " | " | " | " | " | " | " | Aerosil 300, 8 | " | " |
| " | 44 | " | " | " | " | " | " | " | " | Aerosil 300, 8 | " | " |
| " | 45 | " | " | " | " | " | " | " | " | Aerosil 300, 8 | " | " |
| " | 46 | " | " | " | " | " | " | " | " | Aerosil 300, 8 | " | " |
| " | 47 | " | " | " | " | " | " | " | " | Aerosil 300, 8 | " | " |
| " | 48 | " | " | " | " | " | " | " | " | Aerosil 300, 8 | " | " |
| " | 49 | " | " | " | " | " | " | " | " | Aerosil 300, 8 | " | " |
| " | 50 | " | " | " | " | " | " | " | " | Aerosil 300, 8 | " | " |
| Example | 51 | 0 | 0 | 40 | Epoxy | 2900 | 48.7 | HMDI-AEA | 5/10 | Aerosil 300, 8 | 25 | 2 |
| Comparative Example | 52 | " | " | " | " | " | " | " | " | Aerosil 300, 8 | " | " |
| Comparative Example | 53 | " | " | " | " | " | " | " | " | Aerosil 300, 8 | " | " |
| Example | 54 | 1 | " | " | " | " | " | " | " | Aerosil 300, 8 | " | " |
| " | 55 | 3 | " | " | " | " | " | " | " | Aerosil 300, 8 | " | " |
| " | 56 | 5 | " | " | " | " | " | " | " | Aerosil 300, 8 | " | " |
| " | 57 | 7 | " | " | " | " | " | " | " | Aerosil 300, 8 | " | " |
| " | 58 | 10 | " | " | " | " | " | " | " | Aerosil 300, 8 | " | " |
| " | 59 | 0 | 1 | " | " | " | " | " | " | Aerosil 300, 8 | " | " |
| " | 60 | " | 3 | " | " | " | " | " | " | Aerosil 300, 8 | " | " |
| " | 61 | " | 5 | " | " | " | " | " | " | Aerosil 300, 8 | " | " |
| " | 62 | " | 7 | " | " | " | " | " | " | Aerosil 300, 8 | " | " |
| " | 63 | " | 10 | " | " | " | " | " | " | Aerosil 300, 8 | " | " |
| " | 64 | 3 | 1 | " | " | " | " | " | " | Aerosil 300, 8 | " | " |
| " | 65 | " | 3 | " | " | " | " | " | " | Aerosil 300, 8 | " | " |
| " | 66 | " | 5 | " | " | " | " | " | " | Aerosil 300, 8 | " | " |
| " | 67 | " | 7 | " | " | " | " | " | " | Aerosil 300, 8 | " | " |
| Example | 68 | 5 | 1 | 40 | Epoxy | 2900 | 48.7 | HMDI-AEA | 5/10 | Aerosil 300, 8 | 25 | 2 |
| " | 69 | " | 3 | " | " | " | " | " | " | Aerosil 300, 8 | " | " |
| " | 70 | " | 5 | " | " | " | " | " | " | Aerosil 300, 8 | " | " |
| " | 71 | 7 | 1 | " | " | " | " | " | " | Aerosil 300, 8 | " | " |
| " | 72 | " | 3 | " | " | " | " | " | " | Aerosil 300, 8 | " | " |
| Comparative Example | 73 | 5 | 10 | " | " | " | " | " | " | Aerosil 300, 8 | " | " |
| Comparative Example | 74 | 10 | 5 | " | " | " | " | " | " | Aerosil 300, 8 | " | " |
| Example | 75 | 0 | 0 | " | " | " | " | " | " | Aerosil 300, 8 | " | " |
| " | 76 | " | " | " | " | " | " | " | " | Aerosil 300, 8 | " | " |
| " | 77 | " | " | " | " | " | " | " | " | Aerosil 300, 8 | " | " |
| " | 78 | " | " | " | " | " | " | " | " | Aerosil 300, 8 | " | " |
| " | 79 | " | " | " | " | " | " | " | " | Aerosil 300, 8 | " | " |
| " | 80 | " | " | " | " | " | " | " | " | Aerosil 300, 8 | " | " |
| Example | 81 | 0 | 0 | 40 | Epoxy | 2900 | 48.7 | HMDI-AEA | 5/10 | Aerosil 300, 8 | 25 | 2 |
| " | 82 | " | " | " | " | " | " | " | " | Aerosil 300, 8 | " | " |

TABLE 1-continued

| | | | | | | | | | | | |
|---|---|---|---|---|---|---|---|---|---|---|---|
| " | 83 | " | " | " | " | " | " | " | " | Aerosil 300, 8 | " | " |
| " | 84 | " | " | 5 | " | " | " | " | " | Aerosil 300, 8 | " | " |
| " | 85 | " | " | 10 | " | " | " | " | " | Aerosil 300, 8 | " | " |
| " | 86 | " | " | 20 | " | " | " | " | " | Aerosil 300, 8 | " | " |
| " | 87 | " | " | 30 | " | " | " | " | " | Aerosil 300, 8 | " | " |
| " | 88 | " | " | 50 | " | " | " | " | " | Aerosil 300, 8 | " | " |
| " | 89 | " | " | 70 | " | " | " | " | " | Aerosil 300, 8 | " | " |
| " | 90 | " | " | 100 | " | " | " | " | " | Aerosil 300, 8 | " | " |
| " | 91 | " | " | 120 | " | " | " | " | " | Aerosil 300, 8 | " | " |
| " | 92 | " | " | 150 | " | " | " | " | " | Aerosil 300, 8 | " | " |
| Comparative Example | 93 | " | " | 2 | " | " | " | " | " | Aerosil 300, 8 | " | " |
| Comparative Example | 94 | " | " | 200 | " | " | " | " | " | Aerosil 300, 8 | " | " |
| Example | 95 | 0 | 0 | 40 | Epoxy | 470 | 48.7 | HMDI-AEA | 5/10 | Aerosil 300, 8 | 25 | 2 |
| " | 96 | " | " | " | " | 1000 | " | " | " | Aerosil 300, 8 | " | " |
| " | 97 | " | " | " | " | 3750 | " | " | " | Aerosil 300, 8 | " | " |
| Comparative Example | 98 | " | " | " | Oil-free polyester | 15000 | " | " | " | Aerosil 300, 8 | " | " |
| Comparative Example | 99 | " | " | " | Carboxylated polyethylene | 100000 | 75.0 | — | — | Snowtex N, 10–20 | " | — |
| Example | 100 | " | " | " | Epoxy | 2900 | 66.4 | HMDI-AEA | 1/10 | Aerosil 300, 8 | " | 2 |
| " | 101 | " | " | " | " | " | 56.2 | " | 3/10 | Aerosil 300, 8 | " | " |
| " | 102 | " | " | " | " | " | 39.4 | " | 10/10 | Aerosil 300, 8 | " | " |
| " | 103 | " | " | " | " | " | 33.2 | " | 12/10 | Aerosil 300, 8 | " | " |
| " | 104 | " | " | " | " | " | 48.7 | HMDI | 5/10 | Aerosil 300, 8 | " | " |
| Example | 105 | 0 | 0 | 40 | Epoxy | 2900 | 48.7 | HMDI-CLN | 5/10 | Aerosil 300, 8 | 25 | 2 |
| " | 106 | " | " | " | " | " | " | HMDI-AEA3 BKS2 | " | Aerosil 300, 8 | " | " |
| Comparative Example | 107 | " | " | " | " | " | 60.8 | Super-bechamine BKS-316 | 2/10 | Aerosil 300, 8 | " | " |
| Comparative Example | 108 | " | " | " | " | " | " | " | " | Aerosil 300, 8 | " | " |
| Example | 109 | " | " | " | " | " | 62.1 | HMDI-AEA | 5/10 | Aerosil 300, 8 | 5 | " |
| " | 110 | " | " | " | " | " | 58.7 | " | " | Aerosil 300, 8 | 10 | " |
| " | 111 | " | " | " | " | " | 55.3 | " | " | Aerosil 300, 8 | 15 | " |
| " | 112 | " | " | " | " | " | 42.0 | " | " | Aerosil 300, 8 | 35 | " |
| " | 113 | " | " | " | " | " | 35.4 | " | " | Aerosil 300, 8 | 50 | " |
| " | 114 | " | " | " | " | " | 48.7 | " | " | Aerosil 300, 0.1 | 25 | " |
| " | 115 | " | " | " | " | " | " | " | " | 1.0 | " | " |
| " | 116 | " | " | " | " | " | " | " | " | 40 | " | " |
| " | 117 | " | " | " | " | " | " | " | " | 100 | " | " |
| Comparative Example | 118 | 0 | 0 | 40 | Epoxy | 2900 | 48.7 | HMDI-AEA | 5/10 | Silica powder 1000 | 25 | 2 |
| Comparative Example | 119 | " | " | " | " | " | 63.3 | " | " | Aerosil 300, 8 | 3 | " |
| Comparative Example | 120 | " | " | " | " | " | 28.7 | " | " | Aerosil 300, 8 | 55 | " |
| Example | 121 | " | " | " | " | " | 48.7 | " | " | Aerosil 300, 8 | 25 | 0.1 |
| " | 122 | " | " | " | " | " | " | " | " | Aerosil 300, 8 | " | 0.5 |
| " | 123 | " | " | " | " | " | " | " | " | Aerosil 300, 8 | " | 1 |

TABLE 1-continued

| | No. | | | | | | | | | | |
|---|---|---|---|---|---|---|---|---|---|---|---|
| " | 124 | " | " | " | " | " | " | " | Aerosil 300, 8 | " | 3 |
| " | 125 | " | " | " | " | " | " | " | Aerosil 300, 8 | " | 5 |
| " | 126 | " | " | " | " | " | " | " | Aerosil 300, 8 | " | 10 |
| Comparative Example | 127 | " | " | " | " | " | " | " | Aerosil 300, 8 | " | 0 |
| Comparative Example | 128 | " | " | " | " | " | " | " | Aerosil 300, 8 | " | 15 |
| Example | 129 | " | " | " | " | " | " | " | Aerosil 300, 8 | " | 2 |
| Comparative Example | 130 | 0 | 0 | 40 | Epoxy | 2900 | 48.7 | HMDI-AEA | 5/10 | Aerosil 300, 8 | 25 | 2 |
| Comparative Example | 131 | " | " | " | " | " | " | " | Aerosil 300, 8 | " | " |
| Example | 132 | " | " | " | " | " | " | " | Aerosil 300, 8 | " | " |
| " | 133 | " | " | " | " | " | " | " | Aerosil 300, 8 | " | " |
| " | 134 | " | " | " | " | " | " | " | Aerosil 300, 8 | " | " |
| " | 135 | " | " | " | " | " | " | " | Aerosil 300, 8 | " | " |
| " | 136 | " | " | " | " | " | " | " | Aerosil 300, 8 | " | " |
| " | 137 | " | " | " | " | " | " | " | Aerosil 300, 8 | " | " |
| " | 138 | " | " | " | " | " | " | " | Aerosil 300, 8 | " | " |
| Comparative Example | 139 | " | " | " | " | " | " | " | Aerosil 300, 8 | " | " |
| Comparative Example | 140 | " | " | " | " | " | " | " | Aerosil 300, 8 | " | " |

| | No. | Organic solvent Type | Organic solvent Amount | *7 Thickness of coating film mμ | Bath stability | Resistance to liberation of chromium | Press workability | Spot weldability | Electrodeposition coatability | Corrosion resistance |
|---|---|---|---|---|---|---|---|---|---|---|
| Example | 1 | Cyclohexanone | 55.2 | 1.0 | ⊚ | ⊚ | ⊚ | ⊚ | ⊚ | ⊚ |
| " | 2 | Cyclohexanone | " | " | " | " | " | " | " | " |
| " | 3 | Cyclohexanone | " | " | " | " | " | " | " | " |
| " | 4 | Cyclohexanone | " | " | " | " | " | " | " | " |
| " | 5 | Cyclohexanone | " | " | " | " | " | " | " | " |
| " | 6 | Cyclohexanone | " | " | " | " | " | " | " | " |
| " | 7 | Cyclohexanone | " | " | " | " | " | " | " | " |
| " | 8 | Cyclohexanone | " | " | " | " | " | " | " | " |
| " | 9 | Cyclohexanone | " | " | " | " | " | " | " | " |
| " | 10 | Cyclohexanone | " | " | " | " | " | " | " | " |
| " | 11 | Cyclohexanone | " | " | " | " | " | " | " | " |
| " | 12 | Cyclohexanone | " | " | " | " | " | " | " | " |
| " | 13 | Cyclohexanone | " | " | " | " | " | " | " | " |
| " | 14 | Cyclohexanone | " | " | " | " | " | " | " | " |
| " | 15 | Cyclohexanone | " | " | " | " | " | " | " | " |
| " | 16 | Cyclohexanone | " | " | " | " | " | " | " | " |
| " | 17 | Cyclohexanone | " | " | " | " | " | " | " | " |
| " | 18 | Cyclohexanone | " | " | " | " | " | " | " | " |
| Example | 19 | Cyclohexanone | 55.2 | 1.0 | ⊚ | ⊚ | ⊚ | ⊚ | ⊚ | ⊚ |
| " | 20 | Cyclohexanone | " | " | " | " | " | " | " | " |
| " | 21 | Cyclohexanone | " | " | " | " | " | " | " | " |
| Comparative | 22 | Cyclo- | " | " | ⊚~○ | " | " | " | ○~△ | △ |

TABLE 1-continued

| | | | | | | | | | | |
|---|---|---|---|---|---|---|---|---|---|---|
| Example | | hexanone | | | | | | | | |
| Comparative Example | 23 | Cyclo-hexanone | " | " | Δ~X | X | " | " | Δ | ○~Δ |
| Example | 24 | Cyclo-hexanone | " | " | " | ⊙ | " | " | ⊙ | ⊙ |
| " | 25 | Cyclo-hexanone | " | " | " | " | " | " | " | " |
| " | 26 | Cyclo-hexanone | " | " | " | " | " | " | " | " |
| " | 27 | Cyclo-hexanone | " | " | " | " | " | " | " | " |
| " | 28 | Cyclo-hexanone | " | " | " | " | " | " | " | " |
| " | 29 | Cyclo-hexanone | " | " | " | " | " | " | " | " |
| " | 30 | Cyclo-hexanone | " | " | " | " | " | " | " | " |
| " | 31 | Cyclo-hexanone | " | " | " | " | " | " | " | " |
| " | 32 | Cyclo-hexanone | " | " | " | " | " | " | " | " |
| " | 33 | Cyclo-hexanone | " | " | ⊙ | " | " | " | " | " |
| " | 34 | Cyclo-hexanone | " | " | " | " | " | " | " | " |
| " | 35 | Cyclo-hexanone | " | " | " | " | " | " | " | " |
| Example | 36 | Cyclo-hexanone | 55.2 | 1.0 | ⊙ | ⊙ | ⊙ | ⊙ | ⊙ | ⊙ |
| " | 37 | Cyclo-hexanone | " | " | " | " | " | " | " | " |
| " | 38 | Cyclo-hexanone | " | " | " | " | " | " | " | " |
| " | 39 | Cyclo-hexanone | " | " | " | " | " | " | " | " |
| Comparative Example | 40 | Cyclo-hexanone | " | " | " | " | " | " | ○ | Δ |
| Comparative Example | 41 | Cyclo-hexanone | " | " | " | " | " | " | Δ | ○ |
| Example | 42 | Cyclo-hexanone | " | " | " | " | " | " | ⊙ | ⊙ |
| " | 43 | Cyclo-hexanone | " | " | " | " | " | " | " | " |
| " | 44 | Cyclo-hexanone | " | " | " | " | " | " | " | " |
| " | 45 | Cyclo-hexanone | " | " | " | " | " | " | " | " |
| " | 46 | Cyclo-hexanone | " | " | " | " | " | " | " | " |
| " | 47 | Cyclo-hexanone | " | " | " | " | " | " | " | " |
| " | 48 | Cyclo-hexanone | " | " | " | " | " | " | " | " |
| " | 49 | Cyclo-hexanone | " | " | " | " | " | " | " | " |
| " | 50 | Cyclo-hexanone | " | " | " | " | " | " | " | " |
| Example | 51 | Cyclo-hexanone | 55.2 | 1.0 | ⊙ | ⊙ | ⊙ | ⊙ | ⊙ | ⊙ |
| Comparative Example | 52 | Cyclo-hexanone | " | " | " | Δ | " | " | ○ | ○ |
| Comparative Example | 53 | Cyclo-hexanone | " | " | X | — | — | — | — | — |
| Example | 54 | Cyclo-hexanone | " | " | ⊙ | ⊙ | ⊙ | ⊙ | ⊙ | ⊙ |
| " | 55 | Cyclo-hexanone | " | " | " | " | " | " | " | " |
| " | 56 | Cyclo-hexanone | " | " | " | " | " | " | " | " |
| " | 57 | Cyclo-hexanone | " | " | " | " | " | " | " | " |
| " | 58 | Cyclo-hexanone | " | " | " | " | " | " | " | " |
| " | 59 | Cyclo-hexanone | " | " | " | " | " | " | " | " |
| " | 60 | Cyclo-hexanone | " | " | " | " | " | " | " | " |
| " | 61 | Cyclo-hexanone | " | " | " | " | " | " | " | " |
| " | 62 | Cyclo-hexanone | " | " | " | " | " | " | " | " |
| " | 63 | Cyclo- | " | " | " | " | " | " | " | " |

TABLE 1-continued

| | | | | | | | | | | | |
|---|---|---|---|---|---|---|---|---|---|---|---|
| " | 64 | Cyclo-hexanone | " | " | " | " | " | " | " | " |
| " | 65 | Cyclo-hexanone | " | " | " | " | " | " | " | " |
| " | 66 | Cyclo-hexanone | " | " | " | " | " | " | " | " |
| " | 67 | Cyclo-hexanone | " | " | " | " | " | " | " | " |
| Example | 68 | Cyclo-hexanone | 55.2 | 1.0 | ◉ | ◉ | ◉ | ◉ | ◉ | ◉ |
| " | 69 | Cyclo-hexanone | " | " | " | " | " | " | " | " |
| " | 70 | Cyclo-hexanone | " | " | " | " | " | " | " | " |
| " | 71 | Cyclo-hexanone | " | " | " | " | " | " | " | " |
| " | 72 | Cyclo-hexanone | " | " | " | " | " | " | " | " |
| Comparative Example | 73 | Cyclo-hexanone | " | " | " | " | " | " | " | " |
| Comparative Example | 74 | Cyclo-hexanone | " | " | X | " | " | " | ○~△ | ○~△ |
| Example | 75 | Cyclo-hexanone | " | " | X | " | " | " | ○ | ○ |
| " | 76 | Cyclo-hexanone | " | " | ◉ | " | " | " | ◉ | ◉ |
| " | 77 | Cyclo-hexanone | " | " | " | " | " | " | " | " |
| " | 78 | Cyclo-hexanone | " | " | " | " | " | " | " | " |
| " | 79 | Cyclo-hexanone | " | " | " | " | " | " | " | " |
| " | 80 | Cyclo-hexanone | " | " | " | " | " | " | " | " |
| Example | 81 | Cyclo-hexanone | 55.2 | 1.0 | ◉ | ◉ | ◉ | ◉ | ◉ | ◉ |
| " | 82 | Cyclo-hexanone | " | " | " | " | " | " | " | " |
| " | 83 | Cyclo-hexanone | " | " | " | " | " | " | " | " |
| " | 84 | Cyclo-hexanone | " | " | " | " | " | " | " | " |
| " | 85 | Cyclo-hexanone | " | " | " | " | " | " | " | " |
| " | 86 | Cyclo-hexanone | " | " | " | " | " | " | " | " |
| " | 87 | Cyclo-hexanone | " | " | " | " | " | " | " | " |
| " | 88 | Cyclo-hexanone | " | " | " | " | " | " | " | " |
| " | 89 | Cyclo-hexanone | " | " | " | " | " | " | " | " |
| " | 90 | Cyclo-hexanone | " | " | " | " | " | " | " | " |
| " | 91 | Cyclo-hexanone | " | " | " | " | " | " | " | " |
| " | 92 | Cyclo-hexanone | " | " | " | " | " | " | " | " |
| Comparative Example | 93 | Cyclo-hexanone | " | " | " | " | " | " | " | X |
| Comparative Example | 94 | Cyclo-hexanone | " | " | " | ○~△ | " | " | " | ◉ |
| Example | 95 | Cyclo-hexanone | 55.2 | 1.0 | ◉ | ◉ | ◉ | ◉ | ◉ | ◉ |
| " | 96 | Cyclo-hexanone | " | " | " | " | " | " | " | " |
| " | 97 | Cyclo-hexanone | " | " | " | " | " | " | " | " |
| Comparative Example | 98 | Cyclo-hexanone | " | " | " | " | " | " | ○ | ○~△ |
| Comparative Example | 99 | Water | 80 | " | " | " | △~X | " | X | △~X |
| Example | 100 | Cyclo-hexanone | 49.7 | " | " | " | ◉ | " | ◉ | ◉ |
| " | 101 | Cyclo-hexanone | 52.9 | " | " | " | " | " | " | " |
| " | 102 | Cyclo-hexanone | 59.1 | " | " | " | " | " | " | " |
| " | 103 | Cyclo-hexanone | 60.1 | " | " | " | " | " | " | " |
| " | 104 | Cyclo- | 56.7 | " | " | " | " | " | " | " |

TABLE 1-continued

| | No. | Solvent | | | | | | | | |
|---|---|---|---|---|---|---|---|---|---|---|
| Example | 105 | Cyclohexanone | 56.7 | 1.0 | ⊙ | ⊙ | ⊙ | ⊙ | ⊙ | ⊙ |
| " | 106 | Cyclohexanone | 54.2 | " | " | " | " | " | " | " |
| Comparative Example | 107 | Cyclohexanone | 47.7 | " | " | " | " | ○ | " | ⊙~○ | ⊙~○ |
| Comparative Example | 108 | Cyclohexanone | 50.2 | " | " | " | " | " | " | ○ | ○ |
| Example | 109 | Cyclohexanone | 50.5 | " | " | " | " | ⊙ | " | ⊙ | ⊙ |
| " | 110 | Cyclohexanone | 53.0 | " | " | " | " | " | " | " | " |
| " | 111 | Cyclohexanone | 52.5 | " | " | " | " | " | " | " | " |
| " | 112 | Cyclohexanone | 57.5 | " | " | " | " | " | " | " | " |
| " | 113 | Cyclohexanone | 59.8 | " | " | " | " | " | " | " | " |
| " | 114 | Cyclohexanone | 55.2 | " | " | " | " | " | " | " | " |
| " | 115 | Cyclohexanone | " | " | " | " | " | " | " | " | " |
| " | 116 | Cyclohexanone | " | " | " | " | " | " | " | " | " |
| " | 117 | Cyclohexanone | " | " | " | " | " | " | " | " | " |
| Comparative Example | 118 | Cyclohexanone | 55.2 | 1.0 | ⊙ | ⊙ | Δ~X | ○~Δ | ○ | Δ |
| Comparative Example | 119 | Cyclohexanone | 49.3 | " | " | " | ⊙ | ○ | ⊙~○ | Δ~X |
| Comparative Example | 120 | Cyclohexanone | 63.3 | " | " | " | Δ~X | X | Δ~X | ⊙~○ |
| Example | 121 | Cyclohexanone | 55.2 | " | " | " | ⊙ | ⊙ | ⊙ | ⊙ |
| " | 122 | Cyclohexanone | " | " | " | " | " | " | " | " |
| " | 123 | Cyclohexanone | " | " | " | " | " | " | " | " |
| " | 124 | Cyclohexanone | " | " | " | " | " | " | " | " |
| " | 125 | Cyclohexanone | " | " | " | " | " | " | " | " |
| " | 126 | Cyclohexanone | " | " | " | " | " | " | " | " |
| Comparative Example | 127 | Cyclohexanone | " | " | " | " | ○~Δ | " | ○ | ⊙~○ |
| Comparative Example | 128 | Cyclohexanone | " | " | " | " | ⊙ | " | ⊙~○ | ○ |
| Example | 129 | Acetone-M Isophorone-M | " | " | " | " | " | " | ⊙ | ⊙ |
| Comparative Example | 130 | Ethylene glycol monoethyl ether acetate | 55.2 | 1.0 | (Uncoatable due to high viscosity) | | | | | |
| Comparative Example | 131 | Benzyl alcohol | " | " | ⊙ | ⊙ | X | ○ | X | Δ~X |
| Example | 132 | Cyclohexanone | " | 0.3 | " | " | ⊙ | ⊙ | ⊙ | ⊙ |
| " | 133 | Cyclohexanone | " | 0.7 | " | " | " | " | " | " |
| " | 134 | Cyclohexanone | " | 1.4 | " | " | " | " | " | " |
| " | 135 | Cyclohexanone | " | 1.8 | " | " | " | " | " | " |
| " | 136 | Cyclohexanone | " | 2.5 | " | " | " | " | " | " |
| " | 137 | Cyclohexanone | " | 3.5 | " | " | " | " | " | " |
| " | 138 | Cyclohexanone | " | 5.0 | " | " | " | " | " | " |
| Comparative Example | 139 | Cyclohexanone | " | 0.1 | " | ○~Δ | " | " | " | Δ |
| Comparative Example | 140 | Cyclohexanone | " | 10.0 | " | ⊙ | " | X | Δ~X | ⊙ |

Chemicals and test methods for evaluation of properties which were employed in the examples and comparative examples and are shown in Table 1 and in the following notes.
(Notes)
*1: Deposition amount was measured in accordance with JIS H-0401.

TABLE 1-continued

*2: Silane coupling agetn used: γ-Glycidoxypropyltrimethoxysilane

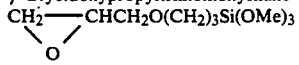

*3: Types and molecular weight of the main resins (The amount added is indicated by % by weight based on the solid content of the coating composition).
Epicoat 1001 (Shell Chemical Co.) - Molecular weight: 900 (Bisphenol type epoxy resin)
Epicoat 1007 (Shell Chemical Co.) - Molecular weight: 2900 (Bisphenol type epoxy resin)
Epicoat 1009 (Shell Chemical Co.) - Molecular weight: 3750 (Bisphenol type epoxy resin)
Biron 200 (Toyobo Co., Ltd.) - Molecular weight: 15000 (Oil free polyester resin)
Carboxylated polyethylene resin containing 12 mol % of carboxyl group in the form of 20% aqueous solution.
*4: Curing agent (Addition amount is indicated by % by weight based on the solid content of the main resin):
(Trimer type)
HMDI: Hexamethylene diisocyanate
HMDI-AEA: HMDI blocked with ethyl acetoacetate
HMDI-CLN: HMDI blocked with ε-caprolactam (for comparison)
Superbeckamine J-820-80 (Dainippon Ink & Chemicals Inc.) containing 60% of melamine resin
Phenolic resin: BKS-316 (Showa Kobunshi Co.) - Resin type phenolic resin
*5: Fumed silica (Addition amount is indicated by % by weight based on the solid content of the coating composition)
Aerosil 300 (Japan Aerosil Co.) - Average particle size 8 mμ
Aerosil 0X50 (Japan Aerosil Co.) - Average particle size 40 mμ
Snowtex N (Nissan Chemical Industries, Ltd.) - 20% aqueous colloidal silica solution.
*6: Polyethylene wax (Addition amount is indicated by % by weight based on the solid content of the coating composition)
Selidust 3620 (Hoechst) - Density 0.95–0.97
Molecular weight 2000
Acid value 0
*7: Weight method: Calculated from the difference in the initial weight of uncoated steel sheet and weight of the same steel sheet which was coated and dried.
*8: Tests on properties:
(1) Bath stability:
The degree of gelation of the bath which has been left at 80° C. for one month after preparation of the bath.
⊚: No gelation occurred.
◯: Slight gelation occurred.
Δ: Gelation occurred although treatment was possible.
X: Complete gelation occurred.
(2) Resistance to liberation of chromium:
The sheet was subjected to the following treatments:
Spraying treatment with 2% solution of FC-L4410 alkali decreasing agent (Nihon Parkarizing Co.) at 60° C. for 3 minutes and then treatment with PB3020 (Nihon Parkarizing Co.) under standard conditions.
Amount of chromium on the sheet before and after the treatment was analyzed by F x A.
⊚: Liberation of chromium: less than 10%
◯: Liberation of chromium: less than 20%
Δ: Liberation of chromium: less than 30%
X: Liberation of chromium: more than 30%
(3) Press workability
The sheet was subjected to the drawing into a cylinder (without oil) and then, the surface of the drawn portion on die side was subjected to the peeling test by cellophane tape.
⊚: No peeling occurred.
◯: Slight scoring occurred (without peeling).
Δ: Powdering slightly occurred.
X: Powdering considerably occurred with peeling.
(4) Spot weldability (continuous dotting property)
Copper electrode of 6 mm in diameter in tip diameter
Pressing power 200 kg · f
Current 8–9 KA
10 cycles per 1 hour
⊚: Continuously more than 5000 dots
◯: Continuously more than 4000 dots
Δ: Continuously more than 2000 dots
X: Continuously less than 2000 dots
(5) Electrodeposition coatability
The sheet was subjected to the phosphate treatment (PB3020/Nihon Parkarizing Co.) and then to the cationic electrodeposition by Power Top U-100 (Nippon Paint Co., Ltd.) at 20 mμ.
① Appearance (gas pin hole and crater)
⊚: No defects occurred.
◯: Gas pin holes were slightly formed.
Δ: Gas pin holes were partially formed.
X: Gas pin holes were formed overall the surface.
② Adhesion (the surface of the sheet was cut crosswise to form 100 squares of 1 × 1 mm and the sheet was dipped in warm water of 40° C. for 10 days and then subjected to the peeling test by cellophane tape)
⊚: No peeling occurred.
◯: Slight peeling occurred.
Δ: Partial peeling occurred.
X: Considerable peeling occurred.
(6) Corrosion resistance
The sheet (with ½ crosscut) was subjected to the salt spraying test (JIS Z-2371) for 2000 hours.
⊚: Less than 20% of white rust.
◯: Less than 30% of red rust.
Δ: Less than 5% of red rust.
X: More than 5% of red rust.

As explained above, the organic composite plated steel sheet of the present invention which comprises a steel sheet plated by a conventional method, a specific hardly soluble chromate film formed thereon as a first layer and, formed thereon, a second layer of a specific coating composition at a given thickness as a solid film is markedly improved in corrosion resistance, press workability, inhibition of liberation of chromium and spot weldability and sufficiently meets the demand of users. Furthermore, since baking of coating film at low temperatures has become possible, deterioration of the substrate is also inhibited.

What is claimed is:

1. A method for producing a corrosion resistant organic composite-plated steel sheet which is inhibited from liberation of chromium, which comprises coating with an aqueous bath composition comprising a chromate bath composition (A), to form a first layer having 5–150 mg/m² solids on a surface of a zinc or zinc alloy-plated or electro-dispersion-plated steel sheet, and then coating on the first layer an organic solvent coating composition (B) to form a second layer having a dry thickness of 0.3–5 μm:

(A) comprising chromate bath composition:
    ① $Cr^{6+}$: 1–30 g/l,
    ② $Cr^{3+}$: 1–30 g/l,
    ③ $Cr^{6+}/Cr^{3+}$ weight ratio 0.1–2.0,
    ④ $HF+H_3PO_4$: 1–60 g/l,
    ⑤ $HF+H_3PO_4/Cr^{3+}$ weight ratio: 0.5–3.5, and
    ⑥ silane coupling agent/$Cr^{6+}$ molar ratio: 0.05–0.3

(B) organic solvent coating composition comprising:
    (a) a bisphenol epoxy resin having a number-average molecular weight of 300–100,000 in an amount of 30% by weight or more based on a solids content of the organic solvents coating composition;
    (b) at least one curing agent selected from the group consisting of polyisocyanate compounds and blocked polyisocyanate compounds at 1/10–20/10 in a weight ratio to a solids content of the bisphenol epoxy resin;
    (c) fumed silica of 0.1–100 mμ in an average particle size in an amount of 5–50% by weight based on the solids content of the coating composition;
    (d) a ketone organic solvent in an amount of 40% by weight or more based on the weight of the coating composition; and the solids content of the coating composition being 10–50% by weight.

2. A method according to claim 1, wherein the silane coupling agent in the chromate bath composition (A) is at least one compound selected from the group consisting of the compounds represented by the following formulas (1) and (2):

(I)

(II)

wherein m+n=4 and n is 1–3,
R is an alkyl group,
X is a methoxy group or an ethoxy group, and
Y is a vinyl group, a mercapto group, a glycidoxy group or a methacryloxy group.

3. A method according to claim 1, wherein the chromate bath composition (A) further contains 10 g/l or less of $Zn^{2+}$ ion and/or $Ni^{2+}$ ion.

4. A method according to claim 1, wherein the ketone organic solvent in the coating composition (B) is at least one compound selected from the group consisting of methyl isobutyl ketone, acetone, cyclohexanone and isophorone.

5. A method according to claim 1, wherein the coating composition (B) further contains a resol phenolic resin in an amount of 10/1–1/10 in weight ratio to a solids content of curing agent (b).

6. A method according to claim 1, wherein the coating composition (B) further contains a polyethylene wax in an amount of 0.1–10% by weight based on the solids content of the coating composition.

* * * * *